United States Patent [19]

Baeuerle

[11] Patent Number: 4,814,289
[45] Date of Patent: Mar. 21, 1989

[54] METHOD FOR THE MANUFACTURE OF THIN-FILM CAPACITORS

[76] Inventor: Dieter Baeuerle, Oberklammer Str. 47, A-4203 Altenberg/Linz, Austria

[21] Appl. No.: 135,482

[22] Filed: Dec. 21, 1987

Related U.S. Application Data

[63] Continuation of Ser. No. 801,326, Nov. 25, 1985, abandoned.

[30] Foreign Application Priority Data

Nov. 23, 1984 [DE] Fed. Rep. of Germany ....... 3442790

[51] Int. Cl.$^4$ .......................... H01L 21/26; H01G 4/12
[52] U.S. Cl. ........................... 437/060; 148/DIG. 14; 148/DIG. 93; 427/53.1; 427/54.1; 357/51; 437/187; 437/238; 437/245; 437/919
[58] Field of Search .................. 148/DIG. 14, 92, 93; 357/23.6, 14, 51; 427/54.1, 53.1; 437/187, 235, 238, 245, 919, 943, 60

[56] References Cited

U.S. PATENT DOCUMENTS

| | | | |
|---|---|---|---|
| 3,781,549 | 12/1973 | Fletcher et al. | 250/211 J |
| 3,796,926 | 3/1974 | Cole et al. | 317/234 R |
| 4,437,139 | 3/1984 | Howard | 361/313 |

OTHER PUBLICATIONS

L. M. Arzubi and R. L. Bishop, "Metal-Oxide Semiconductor capacitor," IBM TDB, vol. 17 No. 6, Nov. 1974.
J. K. Howard, "Dual Dielectric Capacitor," IBM TDB, vol. 23 No. 3, Aug. 1980.
R. A. Bailey and J. H. Nevin, "Thin-Film Multilayer Capacitors . . . ", IEEE Transactions on Parts, Hybirds & Pack., vol PHP-1, No. 4, pp. 361-364, Dec. 1976.
R. Solanki, et al., "Photodeposition of Aluminum Oxide and Aluminum Thin Films", *Appl. Phys. Lett.* 454-456, (Sep. 1983), 43(5).
S. Szikora, et al., "Laser-Induced Deposition of SiO$_2$" Materials Lett. 263-264, (Mar. 1984), 2(4A).

*Primary Examiner*—Brian E. Hearn
*Assistant Examiner*—William Bunch
*Attorney, Agent, or Firm*—Hill, Van Santen, Steadman & Simpson

[57] ABSTRACT

Thin-film capacitors are produced with laser chemical vapor deposition technology on a substrate, which is preferably the substrate of an integrated circuit, by forming alternating layers of electrodes and dielectric.

2 Claims, 1 Drawing Sheet

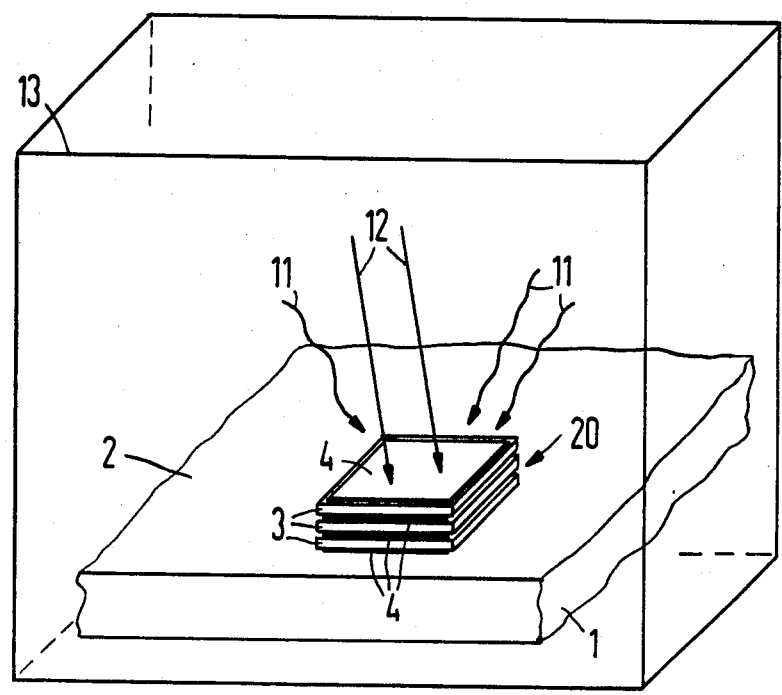

METHOD FOR THE MANUFACTURE OF THIN-FILM CAPACITORS

This is a continuation of application Ser. No. 801,326, filed Nov. 25, 1985, abandoned.

BACKGROUND OF THE INVENTION

1. Field of the Invention

The present invention relates to a method for the manufacture of thin-film capacitors.

2. Description of the Prior Art

Electrical thin-film capacitors are known in the art. Such capacitors are composed of an alternating sequence of electrode layers and dielectric layers lying one over another whereby the electrode layers are connected to likewise alternate for the positive and negative poles of the capacitor. The dielectric layers may be formed of such materials as titanium dixoide, titanates, aluminum oxide, and silicon dioxide. A problem encountered in the manufacturer of such thin-film capacitors relates to the manufacture of optimally thin dielectric layers which have adequate dielectric strength.

Laser-induced deposition is also known per se. Results of tests are disclosed in 43 Appl. Phys. Lett. (5), 454–456 (Sept. 1, 1983) and in 2 Materials Lett., 263–264 (March 1984) describing how thin films of aluminum oxide and silicon dioxide, as well as aluminum and the like, can be produced by means of photo-deposition, i.e. with the assistance of laser radiation. For example, using trimethyl aluminum and $N_2O$ as initial materials, aluminum oxide layers have been deposited in accord with a laser chemical vapor deposition (CVD) method. In the laser CVD method, laser radiation in the ultraviolet range is at perpendicular and/or parallel incidence upon the deposition site. The ultraviolet radiation essentially effects photo-dissociation of the reaction materials. This is carried out at room or elevated substrate temperature. For example, to form a layer of silicon dioxide, an initial basis of hydrosilicon and $N_2O$ is used.

Excimer lasers are preferably used as the source of the laser emission although other lasers, such as visible or infrared lasers, can be used. While the preferred excimer laser reaction is photolytically activated, i.e. non-thermally activated upon employment of excimer laser radiation; the reaction is pyrolytically activated upon employment of visible or infrared laser radiation, i.e. a noticeable temperature elevation occurs locally. The above-mentioned references set forth further details for the implementation of the deposition process and the application of radiation.

SUMMARY OF THE INVENTION

An object ov the present invention is to specify a method with which thin-film capacitors can be manufactured involving optimally little technological outlay. This and other objects are achieved in a method for manufacturing thin-film capacitors on semiconductor chips which serve as a substrate.

In the present invention multiple layers are formed one over another. The metal electrode layers, which can be produced by metal deposition, lie between the multiple layers. Alternating with the metal electrode layers in succession is a photo-deposition of aluminum oxide, silicon dioxide, or a comparable dielectric material.

The layer manufacturing method disclosed herein is suitable for producing extremely thin but dense layers of dielectric. The manufacturing, or deposition, of the dielectric layers is easily interrupted in order to undertake metal coating for the adjacent electrode.

The method of laser-induced deposition utilized in the present invention may be either photolytic, non-thermal, or pyrolytic, thermal, laser chemical vapor deposition. Since the metal coating for the electrode layers is also preferably done by the use of laser light, the method steps for forming the respective dielectric and electrode layers has great uniformity.

DESCRIPTION OF THE DRAWING

A single FIGURE is a perspective view of the method according to the principles of the present invention.

DESCRIPTION OF THE PREFERRED EMBODIMENTS

In the FIGURE, a portion of a semiconductor chip denoted generally at 1 is shown on whose upwardly directed surface 2 a layered capacitor 20 of the present invention is being manufactured. In a preferred embodiment, the surface 2 is opposed by a surface (not shown) of the semiconductor chip 1 on which semiconductor electronic circuits are formed. Thus, the surface 2 may generally be described as a back side of the semiconductor chip 1, although the present method is not limited to manufacture of capacitors on back side surfaces 2. The chip 1 may consist of monocrystaline silicon or any other material.

In the FIGURE, dielectric layers 3 and electrode layers 4 have already been produced. An uppermost electrode layer 4 is the most recently produced and a further dielectric layer is to be formed thereover by laser chemical vapor deposition (LCVD). The dielectric layer which, for example, may be silicon dioxide or aluminum oxide is produced from the respective initial materials of silane and $N_2O$, or by trimethyl aluminum and $N_2O$, all in vapor form, as indicated at 11. Laser light 12 is focused on the electrode surface 4 and allowed to act. Since laser light can be finely focused and its location closely controlled, the location of the photo-deposition can be defined with the placement of the laser light spot. Prescribed structures can thus be generated in this fashion. However, the laser light may also be at parallel incidence to the deposition site. The LCVD method is performed in a vessel 13 to manufacture a thin-film capacitor 20 composed of a plurality of dielectric layers 3 and electrode layers 4 alternatingin succession. Trimethyl aluminum may be used as initial material to produce aluminum electrode layers. However, other metal bearing compounds may be used as well.

On example of a thin-film capacitor formed with silicon dioxide as a dielectric material is described hereinafter. The dielectric field strength of a silicon dioxide layer deposited in accordance with the LCVD method typically amounts to between 6 and 8 MV/cm. For a maximum operating voltage of approximately 20 V and with a safety factor of 2, a dielectric layer thickness of approximately 60 nm for a single layer is required such that an electrical capacitance of approximately 15 nF per layer is achieved for a capacitor area of 25 $mm^2$. The metal electrode layers 4 of the preferred embodiment are 40 nm. When higher capacitance values are required in electronic circuits, capacitance values having multiples of the above quantity are obtainable by depositing a corresponding plurality of the dielectric layers 3 one over another alternating with electrode layers.

A table is attached containing a variety of possibilities for implementing the present invention.

The present invention thus provides a method for producing thin film capacitors, especially on semiconductor chip substrate, by laser induced vapor deposition so that the thickness, shape and density of the dielectric layers of the resulting capacitor.

TABLE 1

A Summary of Laser Applications Toward Oxide Formation

| COMPOUND | SUBSTRATE/ SOURCE, GAS | METHOD | LASER | POSSIBLE APPLICATION | REF. |
|---|---|---|---|---|---|
| $Nb_2O_5$ | $Nb/O_2$ | PLH | XeCl | Josephson Junction | [2] |
| $NbO_2, NbO$ | | | | | |
| $Nb_2O_{5-\delta}$ | $Nb/O_2$ | LPPT | $CO_{2+}$ | Josephson Junction | [1] |
| CdO | Cd/Air | LH | $Kr^+$ | — | [3] |
| $CuO_2$ | Cu/Air | | | — | |
| $Al_2O_3$ | $Si/TMA + N_2O$ | LCVD | KrF, ArF | replace $SiO_2$ | [8] |
| ZnO | Si, Quartz/ $DMZ + N_2O, NO_2$ | LCVD | ArF, KrF | piezoelectric | [5] |
| ZnO | $Si, Al_2O_3, Au, Ti$ Glass, GaAs/ZnO | LE | $CO_2$ | Solar Cell windows | [6] |
| $Cr_2O_3$ | Cr/Air | PLH | Nd:glass | microelectronics | [7] |
| $Cu_2O$ | Cu/Air | LH | $CO_2$ | — | [8] |
| $Ga_2O_3/$ $As_2O_3$ | $GaAs/O_2$ | PLM | Ruby | passivation | [9] |
| " | $GaAs/O_2$ | PLH | $Ar^+$ | passivation | [10] |
| CuO | Cu/Air | LH | $Kr^+$ | — | [26] |
| $TeO_2$ | Te/Air | | | — | |
| $In_2O_3$ | Quartz, InP | LCVD | ArF | dielectric | [27] |
| InO | $GaAs/O_2 +$ $(CH_3)_3InP(CH_3)_3$ | | | | |

TABLE 2

Formation of $SiO_x$ With the Laser as the Primary Energy Source

| MATERIAL/ OXYGEN SOURCE | METHOD | WAVELENGTH | REFERENCE |
|---|---|---|---|
| $O^+$ Implanted Si | Pulse Laser Anneal | 1.06 $\mu m$ | Chiang et al. [4] |
| a-Si/Air or $O_2$ | Pulse Laser Anneal | 694 nm | Garulli et al. [12] |
| a-Si/$O_2$ | cw Laser Anneal | 10.6 $\mu m$ | Boyd [13] |
| c-Si/Air or $O_2$ | Pulse Laser Melting | 1.06 $\mu m$ 530 nm | Hoh et al. [14] |
| c-Si/$O_2$ | Pulse Laser Melting | 308 nm | Orlowski et al. [15] |
| c-Si/$O_2$ | Pulse Laser Amorphization | 266 nm | Liu et al. [16] |
| c-Si/$O_2$ | cw Laser Heating | 500 nm | Gibbons [17] |
| c-Si/$O_2$ or Air | cw Laser Heating | 10.6 $\mu m$ 500 nm | Boyd et al. [18,17,25] |
| c-Si/$O_2$ | Pulse Laser Heating | 694 nm | Cros et al. [20] |
| SiO/Air | Photo-oxidation | 193 nm | Blum et al. [21] |
| c-Si/$SiH_4$ & $N_2O$ | Pulse Laser Photodepositon | 193 nm | Boyer et al. [22,23] |
| c-Si/$SiH_4$ & $N_2O$ | cw Laser Pyrolysis | 531 nm | Szikora et al. [24] | aus Boyd: "Laser Processing and Diagnostics", Editor D. Bauerle, Springer Series in Chem. Phys. Vol.39 (1984), S.274
Serial No. 135,482
1. R. F. Marks, R. A. Pollak, PH. Avouris, "Laser Diagnastics and Photochemical Processing for Semiconductor Devices", North-Holland, New York, USA, 1983, p. 257
2. R .F. Marks, R. A. Pollak (unpublished), see ref. 1.
3. M. Wautelet, L. Baufay, Thin Solid Films, 100, L9 (1983).
4. R. Solanki, W. Ritchie, G. J. Collins, Appl. Phys. Lett. 43, 454 (1983).
5. R. Solanki, G. J. Collins, Appl. Phys. Lett., 42, 662 (1983).
6. H. Sankur, J. T. Cheung, J. Vac. Sci. Technol., Al, 1806 (1983).
7. S. M. Metev, S.K. Savtchenko, K. Stamenov, J. Phys. D13, L75 (1980).
8. I. Ursu, L. C. Nistor, V. S. Teodorescu, I.N. Mihailescur, I. Apostol, L. Nanu, A.M. Prokhorov, N. I. Chapliev, V. I. Konov, V. N. Tokarev, V. G. Ralchenko, SPIE Ind. Appl. of Lasers, V398, paper 398-69 (1983).
9. M. Matsuura, M. Ishida, A. Suzuki, K. Hara, Japan J. Appl. Phys., 20, L726, (1981).
10. W.G. Petro, I. Hino, S. English, I. Lindau, C.Y. Su, W.E. Spicer, J. Vac. Sci. Technol., 21 405 (1982).
11. S. W. Chiang, Y. S. Liu, R. F. Reihl, Appl. Phys. Lett., 39, 752 (1981).
12. A. Garulli, M. Servidori, I. Vecchi, J. Phys. D, 13, L199 (1981).
13. I. W. Boyd, Appl. Phys., A31, 71 (1983).
14. K. Hoh, H. Koyama, K. Uda, Y. Miura, Japan J. Appl. Phys. 19, L375 (1980).
15. T. E. Orlowski and H. Richter, in "Laser-Controlled Chemical Processing of Surfaces", eds. A. W. Johnson, D. J. Ehrlich (North-Holland, New York, 1984).
16. Y. S. Liu S. W. Chiang, F. Bacon, Appl. Phys. Lett., 38, 1005, (1981).
17. J. F. Gibbons, Japan, J. Appl. Phys. Suppl. 19, 121, (1981).
18. I. W. Boyd, J. I. B. Wilson, J. L. West, Thin Solid Films, 83 L173 (1981).

TABLE 2-continued

19. I. W. Boyd, J. I. B. Wilson, Appl. Phys. Letts. 41, 162, (1982).
20. A. Cros. F. Salvan, J. Derrien, Appl. Phys., A28, 241 (1982).
21. S.E. Blum, K. Brown, R. Srinivasan, Appl. Phys. Lett., 43, 1026 (1983).
22. P. K. Boyer, G. A. Roche, W. H. Ritchie, G. J. Collins, Appl. Phys. Lett., 40, 716 (1982).
23. P. K. Boyer, W. H. Ritchie, G. J. Collins, J. Electrochem. Soc., 129, 2155 (1982).
24. S. Szikora, W. Krauter, D. Bauerle, Materials Letters, 2,263 (1984).
25. I. W. Boyd, T. D. Binnie, J. I. B. Wilson, M. J. Colles, J. Appl. Phys., 55, 3061 (1984), and references therein.
26. M. Wautelet, Materials Letters, 2, 20 (1984).
27. V. M. Donnelly, M. Geva. J. Long, R. F. Karlicek, Appl. Phys. Lett., 44, 951 (1984).

I claim as my invention:

1. A method for the manufacture of thin-film capacitors on a semiconductor substrate of an integrated circuit where the capacitor is formed of superimposed alternating layers of electrode material and a dielectric, the method comprising:

forming thin-film electrode layers from a vapor phase in accordance with a laser emission induced deposition method, said electrode layers being of a material selected from the group consisting of aluminum and silicon;

forming thin-film layers of dielectric from a vapor phase in accordance with laser emission induced deposition methods, said dielectric layers being of a material selected from the group consisting of silicon dioxide and aluminum oxide, said dielectric layers being formed alternately with said electrode layers; and directing laser emission substantially perpendicular to said semiconductor substrate during said laser emission induced deposition to selectively deposit by focusing said laser on areas of said substrate for formation of said layers to monolithically integrate said capacitor in the existing circuit of said substrate while avoiding damage to the integrated circuit.

2. A method as claimed in claim 1, further comprising:

depositing a predetermined multiple of said electrode layers alternately with said dielectric layers to achieve a predetermined capacitance value for said thin-film capacitor.

* * * * *